US008713147B2

(12) United States Patent
Ferris et al.

(10) Patent No.: US 8,713,147 B2
(45) Date of Patent: Apr. 29, 2014

(54) MATCHING A USAGE HISTORY TO A NEW CLOUD

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 169 days.

(21) Appl. No.: 12/953,757

(22) Filed: Nov. 24, 2010

(65) Prior Publication Data

US 2012/0131161 A1 May 24, 2012

(51) Int. Cl.
*G06F 15/173* (2006.01)

(52) U.S. Cl.
USPC ........................................................ 709/223

(58) Field of Classification Search
USPC .................................................. 709/203, 223
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,046,468 B2 * | 10/2011 | Isci et al. | 709/226 |
| 8,291,416 B2 * | 10/2012 | Cartales | 718/1 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 * | 6/2005 | Fatula, Jr. | 707/8 |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |

(Continued)

OTHER PUBLICATIONS

Morgan, "Systems and Methods for Detecting Resource Consumption Events Over Sliding Intervals in Cloud-Based Network", U.S. Appl. No. 13/148,235, filed May 31, 2011.

(Continued)

*Primary Examiner* — Ario Etienne
*Assistant Examiner* — Kidest Mendaye
(74) *Attorney, Agent, or Firm* — Lowenstein Sandler LLP (57) ABSTRACT

Embodiments relate to systems and methods for identifying usage histories and end users that may benefit from being redeployed to a new cloud-based network. In particular, a new cloud can receive usage histories corresponding to end user usage in a respective set of other pre-existing clouds. In embodiments, the new cloud can determine whether the new cloud provides sufficient resources to properly host each end user recorded in the usage histories. Further, the new cloud can determine whether there is a cost benefit or other advantage for a user to move to the new cloud. In embodiments, a deployment recommendation may be sent to an administrator of the cloud associated with the desirable usage history.

17 Claims, 6 Drawing Sheets

(56) References Cited

U.S. PATENT DOCUMENTS

| | | |
|---|---|---|
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0172312 A1* | 7/2008 | Synesiou et al. ............... 705/34 |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1* | 11/2009 | Nickolov et al. ............. 717/177 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0076856 A1* | 3/2010 | Mullins ........................... 705/26 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0235355 A1* | 9/2010 | Carter et al. ................ 707/736 |
| 2010/0250746 A1* | 9/2010 | Murase ........................ 709/226 |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2010/0325199 A1* | 12/2010 | Park et al. ..................... 709/203 |
| 2011/0016214 A1 | 1/2011 | Jackson |
| 2011/0041126 A1* | 2/2011 | Levy et al. ....................... 718/1 |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0119104 A1* | 5/2011 | Levine et al. ................ 705/7.25 |
| 2011/0131335 A1 | 6/2011 | Spaltro et al. |
| 2011/0145094 A1* | 6/2011 | Dawson et al. ............ 705/26.63 |
| 2011/0151892 A1* | 6/2011 | Vengroff et al. ............ 455/456.3 |
| 2011/0191477 A1* | 8/2011 | Zhang et al. .................. 709/226 |
| 2011/0213712 A1* | 9/2011 | Hadar et al. .................... 705/80 |
| 2011/0251937 A1* | 10/2011 | Falk et al. ....................... 705/34 |
| 2011/0264805 A1* | 10/2011 | Breitgand et al. ............ 709/226 |
| 2012/0016721 A1* | 1/2012 | Weinman ..................... 705/7.35 |
| 2012/0030356 A1* | 2/2012 | Fletcher ....................... 709/226 |
| 2012/0042312 A1* | 2/2012 | Isci et al. .......................... 718/1 |
| 2012/0130873 A1* | 5/2012 | Morgan ......................... 705/34 |
| 2012/0254420 A1* | 10/2012 | Hassan et al. ................ 709/224 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27. 2011.

Morgan, "Systems and Methods for Tracking Cloud Installation information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., www.rpath.com, 3 pgs.

White Paper—"rPath Versus Other Software Appliance Approaches", Mar. 2008, rPath, Inc., www.rpath.com, 9 pgs.

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

Ferris et al, "Methods and Systems for Converting Standard Software Licenses for Use in Cloud Computing Environments", U.S. Appl. No. 12/714,099, filed Feb. 26, 2010.

Ferris et al, "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

(56) References Cited

OTHER PUBLICATIONS

Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28. 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23. 2010.
Ferris et al., "Systems and Methods for Migrating Subscribed Services in a Cloud Deployment", U.S. Appl. No. 12/955,277, filed Nov. 29, 2010.
Ferris et al., "System and Methods for Migrating Subscribed Services from a Set of Clouds to a Second Set of Clouds", U.S. Appl. No. 12/957,281, filed Nov. 30, 2001.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules Into One or More Clouds", U.S. Appl. No. 12/952,701, filed Nov. 23, 2010.
Ferris et al. "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

| USER | PERIOD | RESOURCE | PRICING |
|---|---|---|---|
| User 1 | | | |
| User 1 | Q1 | Reserved basic VM | $60 |
| User 1 | Q2 | Reserved basic VM | $60 |
| User 1 | Q3 | Reserved basic VM | $60 |
| User 1 | Q4 | Reserved basic VM | $60 |
| User 1 | Q4 | 80 GB on-demand storage | $20 |
| User 2 | | | |
| User 2 | Q1 | 100 hrs on-demand Hi-CPU VM | $50 |
| User 2 | Q2 | 110 hrs on-demand Hi-CPU VM | $55 |
| User 2 | Q3 | 95 hrs on-demand Hi-CPU VM | $47.50 |
| User 2 | Q4 | 102 hrs on-demand Hi-CPU VM | $51 |

FIG. 4A

| RESOURCE | PRICING |
|---|---|
| Small Std on-demand VM | .09/hr |
| Large Std on-demand VM | .34/hr |
| Small Hi-Mem on-demand VM | .60/hr |
| Large Hi-Mem on-demand VM | $1.20/hr |
| Small Hi-CPU on-demand VM | .50/hr |
| Large Hi-CPU on-demand VM | .68/hr |
| ⋮ | ⋮ |
| Small Std Reserved VM | $240/yr |
| Large Std Reserved VM | $910/yr |
| ⋮ | ⋮ |
| Up to 10 TB per month data xfer | .15/GB |
| Next 40 TB per month data xfer | .11/GB |
| ⋮ | ⋮ |
| Up to 100 GB on-demand storage | $10/Qtr |
| Next 100 GB on-demand storage | $8/Qtr |

MATCHING A USAGE HISTORY TO A NEW CLOUD

FIELD

The present teachings relate to systems and methods for identifying usage histories for populating new clouds, and more particularly to platforms and techniques for securing cloud users that can benefit from moving to a newly available cloud.

BACKGROUND

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. Pricing may vary based on the resources used and based on the particular cloud hosting the resources, among other things.

The cloud network provider provides or maintains an amount of resources in the cloud network, such as server uptime, persistent storage, software application instantiation, network performance, cloud storage, support response time, and other elements. The operation or utilization of the resources by the end user(s) generates a usage history associated with the cloud network that details consumption amounts and patterns, the amount charged for resource consumption, and other metrics.

A user of cloud resources, such as an ISV or other end user, may prefer to minimize their cost of using the cloud resources. There may be several ways to do this, including minimizing the price paid for high volume, often-used resources, reducing the amount of overcapacity being paid for, entering into a SLA or subscription agreement that provides discounts for bundling specified packages or configurations of resources, extending the time of a subscription agreement in exchange for a discount, finding discounted rates for off-peak usage of specific resources, using cheaper resources in place of expensive resources, etc. It is typically the case, however, that a cloud user is unaware of the resource advantages, pricing advantages, and discount advantages, among others, that are offered or available from other clouds, and particularly from new clouds that have come into existence since the user starting using its current cloud.

Therefore, it may be desirable to provide systems and methods for matching a usage history of a user with the resource capabilities and pricing capabilities of a newly available cloud. In particular, it may be desirable to provide systems and methods that notify cloud users who can upgrade their resource usage and/or reduce their costs by moving to a newly available cloud and facilitate a move from the user's current cloud to the new cloud.

DESCRIPTION OF EMBODIMENTS

Embodiments of the present teachings relate to systems and methods for beneficial placement of users into newly available clouds. In particular, embodiments relate to platforms and techniques for analyzing usage histories in order to identify cloud users that can improve, maximize, and/or optimize their resource usage and/or cost efficiency by utilizing a new cloud instead of the cloud on which they are currently deployed. The new cloud may have a specified set of new resources and new capabilities, including new pricing capabilities, that are available to be utilized by, for example, end users. For example, the new cloud may have software resources offered in a Software as a Service (SaaS) model, and various hardware resources offered on a capacity basis. The new cloud may price usage of its various resources in a manner that differs from the pricing employed by existing clouds.

A user of an existing cloud may be motivated to reduce the cost of its current cloud resource usage, gain the use of additional cloud resources for the same price, or otherwise benefit from a change to the resources and/or pricing provided by the user's current cloud deployment. For example, a user simply may want to reduce the price it pays for cloud resource usage by 10%, while maintaining its current capabilities. This is a difficult goal for a user to achieve, however, because a user cannot easily identify and analyze the resources and pricing available from other clouds. In particular, a user typically will have no knowledge whatsoever of a new cloud that recently came into existence, including no knowledge of the new cloud's resources and pricing structure.

According to embodiments, a deployment component may collect a set of usage histories containing resource usage/consumption data and/or cost/pricing data for an end user(s) of an existing cloud network(s). The deployment component may determine or identify a usage history(ies) that would benefit from being run on the resources in the new cloud and/or benefit from the pricing structure of the new cloud. This determination or identification may be made, for example, through running simulations, applying models, and/or other analysis of the usage histories as applied to the resources and pricing associated with the new cloud. In embodiments, the deployment component may generate a deployment recommendation or offer for the user(s) or entity (ies) whose usage histories indicate a benefit in switching to the new cloud versus staying deployed on its current cloud. In some embodiments, the recommendation or offer may be presented via an administrator of the new cloud. In some embodiments, the administrator of the new cloud may design the new cloud's resources and pricing in a manner that makes deployment to the new cloud attractive or beneficial to users of existing clouds, including designs that target users having specific resource usage and/or cost characteristics.

Embodiments as described herein can be implemented in or supported by a cloud network architecture. As used herein, a "cloud" can refer to a cloud-based network comprising a collection of resources that can be invoked to instantiate a virtual machine, process, or other resource for a limited or defined duration. As used herein, a "user" or an "end user" can refer to a person, customer, subscriber, corporation, organization, or other entity accessing files and/or devices storing the files in the cloud. In embodiments, the end user can operate or manage computer software or hardware that can access files and/or devices storing the files in the cloud-based network. Further, as used herein, an "administrator" of a cloud can refer to a person, owner, corporation, organization, or other entity having authoritative power to initialize, oversee, or otherwise manage the operation of a cloud.

As used herein, the "resources" of a cloud can refer to software and/or hardware such as, for example, applications, programs, servers, device drivers, storage such as hard drives, virtual memory, databases, random access memory (RAM) and other memory, processors, multimedia cards, and the like, in the cloud. The resources can be accessed by users or by software or applications independent from or associated with resources of the cloud. In embodiments, vendors such as ISVs can supply software resources for use with other resources in a cloud. Resources of the cloud can further refer to any communications resources, such as ports, channels, or bandwidth provided to a virtual machine or other machine or process in the cloud. Resources can likewise include services, such as Web-based services deployed in the cloud, for example security or identity management services and/or other types of services.

As used herein, "optimize" can be a general term that can refer to one of the best available options. In other words, an "optimized" configuration need not represent the best possible configuration, but instead can mean a preferred or desirable configuration that is among the better of the possible configurations. Further, the term "optimize" can also mean maximize, enhance, improve, or other term related to a providing a benefit that was not previously present, especially with respect to performance and cost. Still further, as used herein, a "simulation" can refer to a projection, model, analysis, assessment, breakdown, evaluation, and other terms that can refer to any type of analysis of data.

Figure 1:
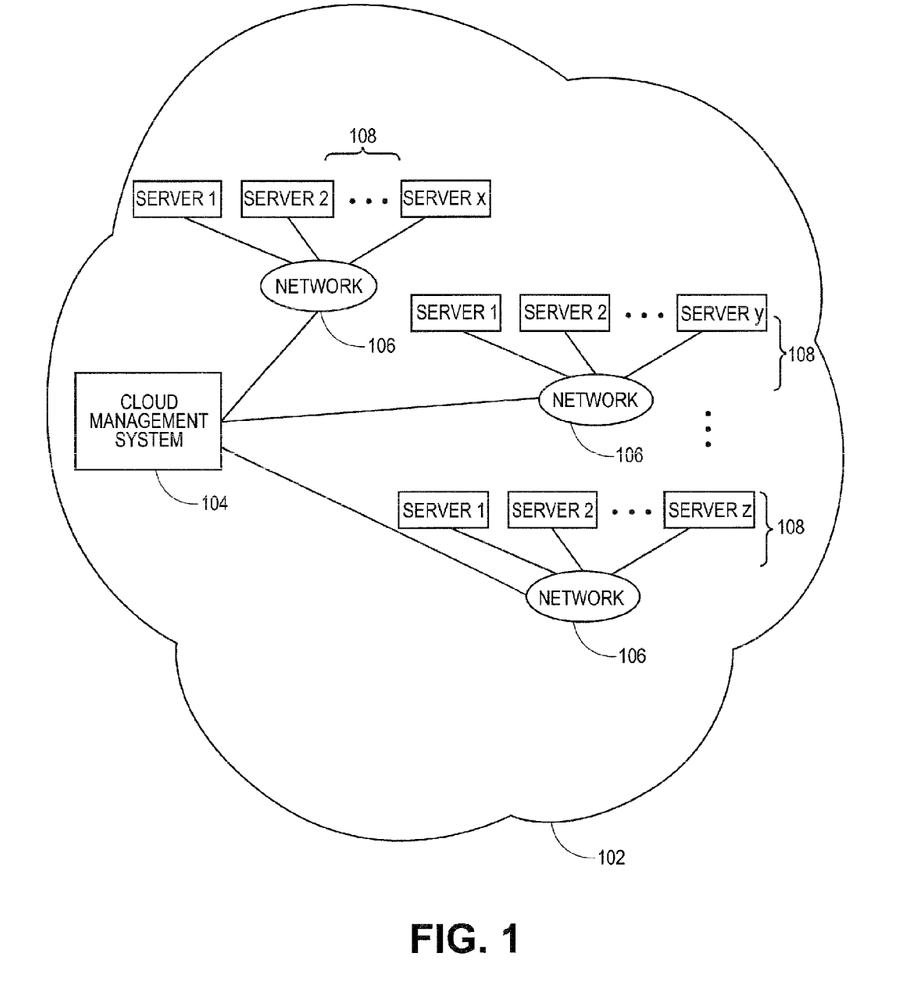
FIG. 1 illustrates an exemplary overall cloud system architecture in which various embodiments of the present teachings can be practiced.

FIG. 1 illustrates an exemplary overall cloud system architecture in which various embodiments of the present teachings can be practiced. As shown in the example of FIG. 1, the collection of resources supporting a new cloud 102, which is a cloud that has been recently brought into existence, can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

A new cloud 102 may employ technology and technique advances (e.g., improved hardware and software) such that new cloud 102 offers a new set of resources and/or a new set of capabilities and/or a new set of pricing options, in comparison to existing clouds.

In embodiments, the entire set of resource servers 108 or other hardware or software resources used to support the new cloud 102 along with its instantiated virtual machines is managed by a cloud management system 104. The cloud management system 104 can comprise a dedicated or centralized server and/or other software, hardware, and network tools that communicate via network 106, such as the Internet or other public or private network, with all sets of resource servers to manage the new cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the new cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, a quarter or a year, or other increment of time. In embodiments, the user's instantiation request can specify the instantiation of a set of virtual machines or processes on an on-demand task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes or specify a predefined set of resources, marketed as a certain configuration of virtual machine, such as a standard configuration, high memory configuration, or high CPU configuration. Other parameters and settings can be used. One skilled in the art will realize that the user's request can likewise include combinations of the foregoing exemplary parameters, and others. In some embodiments, the user's request for resources on the new cloud 102 may be for the same resources that the user was using on their former cloud before migrating to the new cloud 102. In some embodiments, the user's request for resources may be generated using the user's usage history from their former cloud.

When the request to instantiate a set of virtual machines or for other resources has been received and the necessary resources to build that machine or resources have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the new cloud can be leveraged as needed. For example, other software services that are provided outside of the new cloud 102 and hosted by third parties can be invoked by in-cloud virtual machines. For further example, other non-cloud hardware and/or storage services can be utilized as an extension to the new cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or closely approximate the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, amounts of storage, communications bandwidth, or applications or other software prepared to be served.

Figure 2:
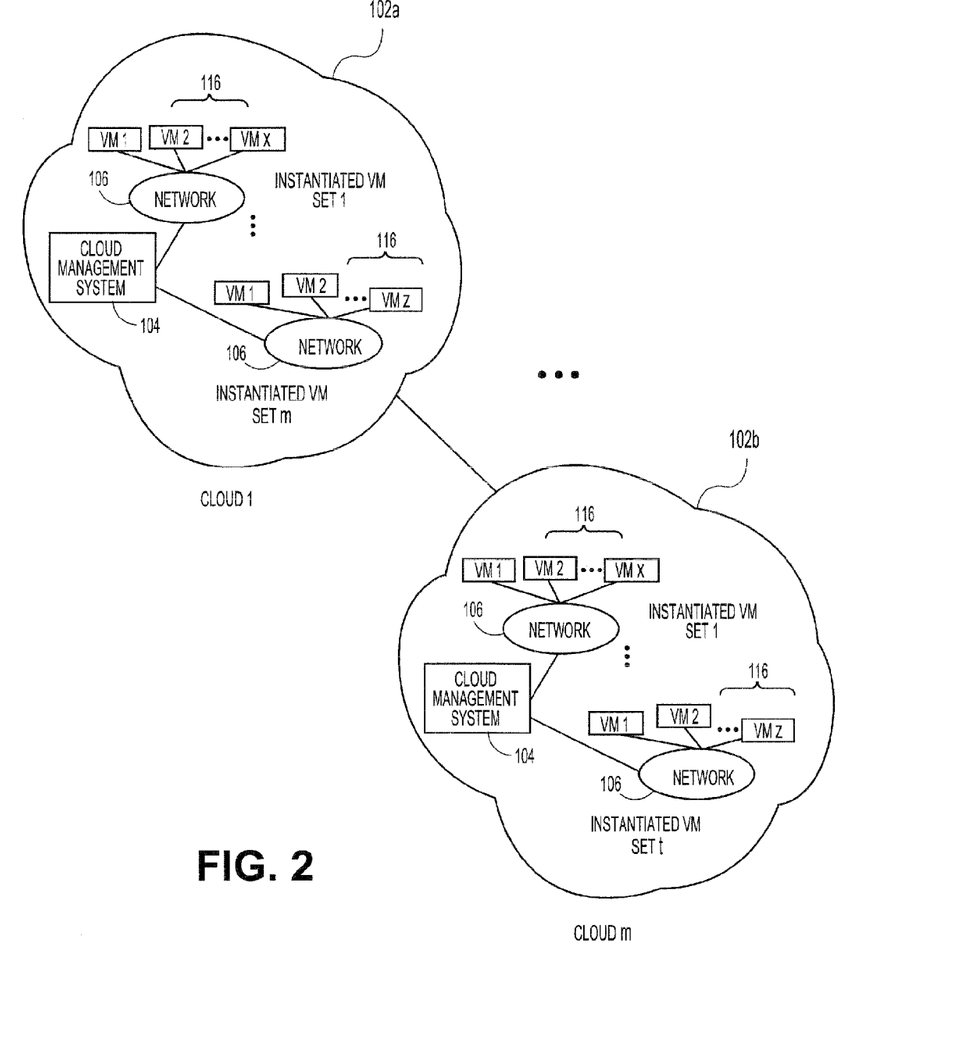
FIG. 2 illustrates an exemplary overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. In other embodiments, system 104 may calculate the number, types, and configuration of virtual machines 116 that could potentially be instantiated, when needed, and keep track of the potential virtual machine data without actually instantiating any of the virtual machines 116 in the new cloud 102 before each one is needed. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user according to the pricing policies of new cloud 102. In embodiments, the cloud management system 104 can for example meter the usage and/or duration of the set of instantiated virtual machines 116, to generate subscription billing records for a user that has migrated to new cloud 102 and launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in a new cloud 102a or 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given new cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a new cloud 102a, 102b hosting multiple sets of virtual machines. Each of the individual sets of virtual machines can be hosted in a respective partition or sub-cloud of the resources of the main new cloud 102a, 102b. The cloud management system 104 of a cloud can for example deploy services specific to isolated or defined sub-clouds, or isolate individual workloads/processes within the cloud to a specific sub-cloud. The subdivision of the new cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first new cloud 102a can also interact with a set of instantiated virtual machines or processes generated in a second, third or further cloud 102b, which may be a new cloud or an existing cloud.

Further, the cloud management system 104 of the first new cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

Figure 3:
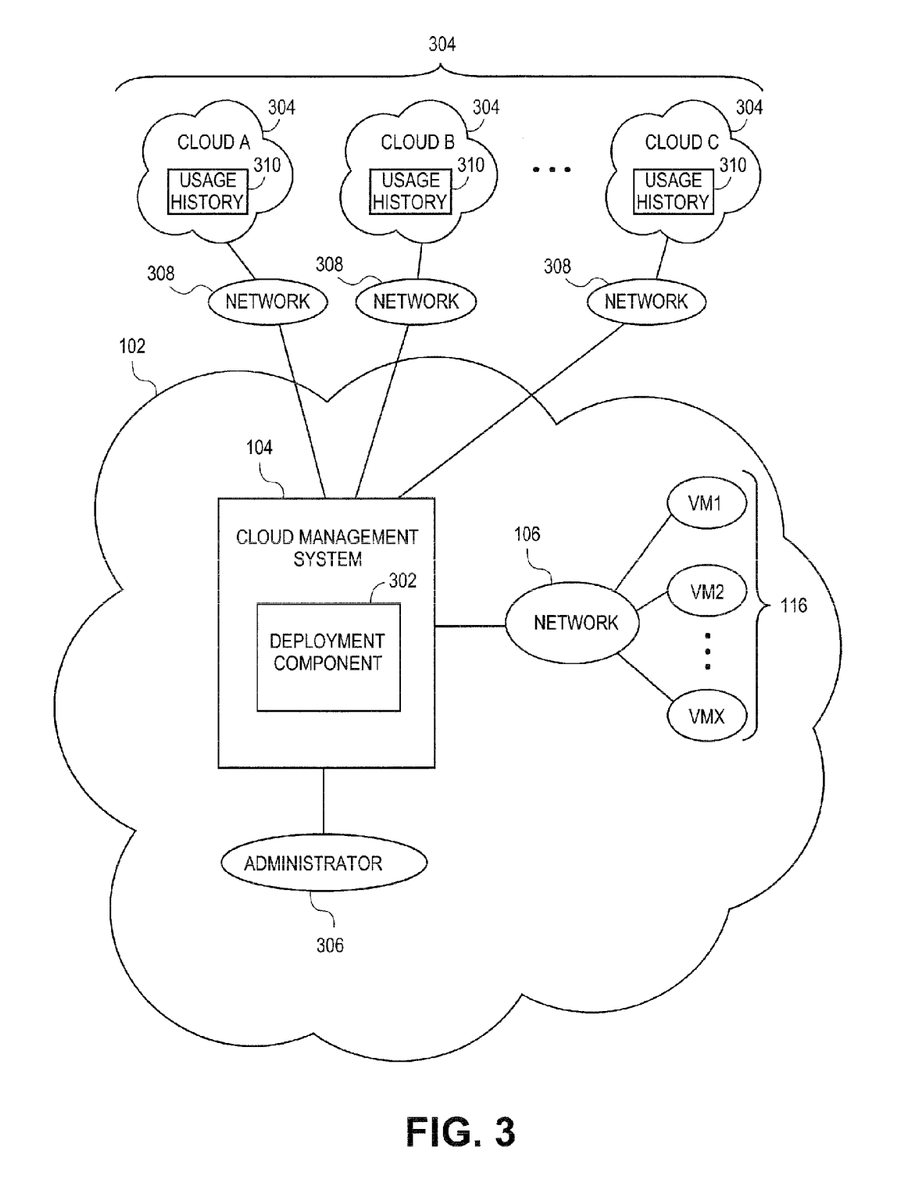
FIG. 3 illustrates an exemplary network configuration that can be used in systems and methods for identifying usage histories that are candidates for advantageously moving to a new cloud, according to various embodiments.

FIG. 3 illustrates an exemplary network configuration that can be used in systems and methods for identifying usage histories for possible migration to a new cloud 102. In the embodiment shown, the cloud management system 104 can comprise a deployment component 302 configured to interface with an administrator 306 and with the set of instantiated virtual machines 116 via the network 106. The deployment component 302 can further be configured to interface with a set of existing clouds 304 via one or more other networks 308, or the network 106. It should be appreciated that the deployment component 302 can be implemented on other hardware and/or software components or can be configured to interface with the other components and entities described herein. Further, it should be appreciated that the deployment component 302 can be configured to interface with additional existing clouds (not shown in figures) and associated resources, such as virtual machines, of the additional clouds. Further still, it should be clear that although the example shown in FIG. 3 depicts deployment component 302 in association with the cloud management system 104 of new cloud 102, in certain embodiments deployment component 302 may instead be associated with one or more of the existing clouds 304. In such embodiments, deployment component 302 receives information about the resources and/or pricing capabilities of new cloud 102 and analyzes these capabilities with respect to at least a usage history 310 of local users for potential migration of a local user(s) to the new cloud 102.

In embodiments, the administrator 306 can be any person, owner, corporation, organization, or other entity having authoritative power to initialize, oversee, or otherwise manage the operation of a target cloud 102. In embodiments, the administrator 306 can manage the delivery or provisioning of software applications, or other software, hardware, or other products or services, such as products and services of one or more ISVs (not shown in figures), to end users accessing the new cloud 102. In embodiments, the end users can access the set of instantiated virtual machines 116 located in the new cloud 102. It should be appreciated that the administrator 306 can enter into one or more service agreements with vendors or other entities to provide resources to end users in one or multiple clouds, and/or across multiple products and/or product lines.

The deployment component 302 can receive a set of usage histories 310 from the set of existing clouds 304 via the one or more networks 308. In embodiments, each of the set of usage histories 310 can comprise respective end user data regarding utilization of resources within the set of existing clouds 304 along with pricing or cost data for the utilization. A usage history may contain captured cost or billing data along with hardware, storage, software, and other resource consumption information and patterns for users of existing cloud 304, on an individual and/or group basis. For example, as shown in FIG. 3, existing cloud A can have an associated usage history 310, existing cloud B can have an associated user history 310, and so on. In embodiments, the set of usage histories 310 can comprise data related to the operation, consumption, and pricing of any of the resources within the set of existing clouds 304. For example, the data can comprise any processing, consumption, storage, execution, pricing, cost, subscription, or transfer data, or any other data or metrics related to the operation or billing of any hardware, software, or other resources within the set of existing clouds 304 in relation to the end users.

In some embodiments, the deployment component 302 can simulate, model, or otherwise analyze each of the set of usage histories 310 with respect to resources within the new cloud 102, such as on the set of instantiated virtual machines 116. For example, the deployment component 302 can compare any processing power utilization data in a received usage history data 310 to the processing power available on a set of instantiated, or potentially instantiated, virtual machines 116. For further example, the deployment component 302 can compare any file storage utilization data in a received usage history data 310 to the data storage available on a set of instantiated, or potentially instantiated, virtual machines 116. For yet further example, the deployment component 302 can compare any file transfer utilization data in a received usage history data 310 to the data transfer capability on the set of instantiated, or potentially instantiated, virtual machines 116. This comparison analysis may yield a determination as to whether a new cloud 102 offers resources sufficient to host a user on the new cloud 102 according to the user's resource usage history. It should be appreciated that in other embodiments, deployment component 302 may use other methods to analyze usage history data 310 with respect to the feasibility and benefits of hosting a similar quantity and type of resource usage on the new cloud 102.

In addition to resources, deployment component 302 may perform other analyses, including comparing the cost/pricing data in a received usage history data 310 to the cost/pricing structure associated with new cloud 102. This analysis may be done on a general basis, such as with respect to an overall subscription price, or with respect to the pricing of each specific resource (e.g., processing power, file storage, data transfer, etc.). The choice may depend on the billing options offered by the new cloud 102 and the existing cloud 304.

In embodiments, the deployment component 302 can simulate, model, or otherwise analyze the billing or cost data in each of the set of usage histories 310 with respect to billing or pricing offered in new cloud 102. For example, the deployment component 302 can compare the subscription price paid by a user for a specified set of resources on an existing cloud (e.g., $240.00 per year for a reserved instance of one virtual machine providing 1.7 GB memory, one virtual core, 160 GB storage, and 3 MB/s I/O bandwidth) with the subscription pricing offered by the new cloud 102 for a compatible set of resources (e.g., $240.00 per year for a reserved instance of one virtual machine providing 2.0 GB memory, one virtual core, 250 GB storage, and 3 MB/s I/O bandwidth). For another example, the deployment component 302 may compare a usage history's on-demand pricing of a Linux high-memory VM instance resource usage (e.g., $0.50 per hour) with a new cloud 102's pricing of Linux high-memory VM instance usage (e.g., $0.34 per hour). For yet another example, the deployment component 302 may compare a usage history's data transfer resources pricing (e.g., $0.15 per GB of data transfer up to 10 terabytes per month, and $0.11 per GB thereafter) with the data transfer resource pricing offered by the new cloud 102 (e.g., $0.15 per GB up to 10 terabytes per month, and $0.08 per GB thereafter).

In some embodiments, discrete pricing comparisons may be analyzed in combination with a user's usage patterns to determine the overall cost of using the existing cloud 304 versus migrating to a new cloud 102. For example, a usage history analysis may show that a user periodically exceeds its prepaid capacity for a certain resource on an existing cloud 304 and thus purchases on-demand resource capacity on existing cloud 304 (at relatively expensive on-demand prices) to handle the excess. The analysis may further show that an available level of prepaid capacity of the same resource on the new cloud may be enough to handle the excess without resorting to on-demand purchasing. It should be appreciated that any pricing or subscription data or other cost metrics within the usage histories 310 can be applied and analyzed with respect to the resources and pricing of the new cloud 102. It should also be appreciated that in other embodiments, deployment component 302 may use other methods to analyze usage history data 310 with respect to the feasibility and benefits of hosting a similar quantity and type of resource usage on the new cloud 102.

As an output, the pricing comparison analysis may yield a determination as to whether a new cloud 102 offers an improved or optimized option for a resource or set of resources in comparison to the current deployment on an existing cloud 304. For example, the pricing comparison analysis may indicate that new cloud 102 offers the same, or a closely comparable, set of resources at a lower cost, in which case it would benefit a user to migrate from their existing cloud 304 to new cloud 102. For another example, the pricing comparison analysis may indicate that new cloud 102 offers a better set of resources (e.g., faster processor, more storage, etc.) at the same cost, in which case it would improve the user's services and experience to redeploy to the new cloud 102.

In embodiments, the deployment component 302 can notify the administrator 306 of the usage history(ies) that it has identified that may benefit from the capabilities and/or pricing available from the new cloud 102. In embodiments, the administrator 306 can be notified of any of the results of the analyses performed by deployment component 302, in any way, and via any data communication. Further, in embodiments, the deployment component 302 can generate or provide a deployment recommendation or offer to an administrator, owner, or other user associated with any of the set of existing clouds 304. For example, if the resources of the new cloud 102 more optimally fulfill the requirements (e.g., provide the same resources at a cheaper price) indicated in usage history 310 associated with existing cloud A of the set of clouds 304, then the administrator 306 can contact an administrator of cloud A (or the user of cloud A associated with usage history 310) in an effort to redeploy the associated user from cloud A to the new cloud 102. It should be appreciated that the administrator 306 or other entity can contact an administrator or a user associated with any of the set of existing clouds 304, or other existing clouds, in any way, with any type of information or offer.

Figure 4A:
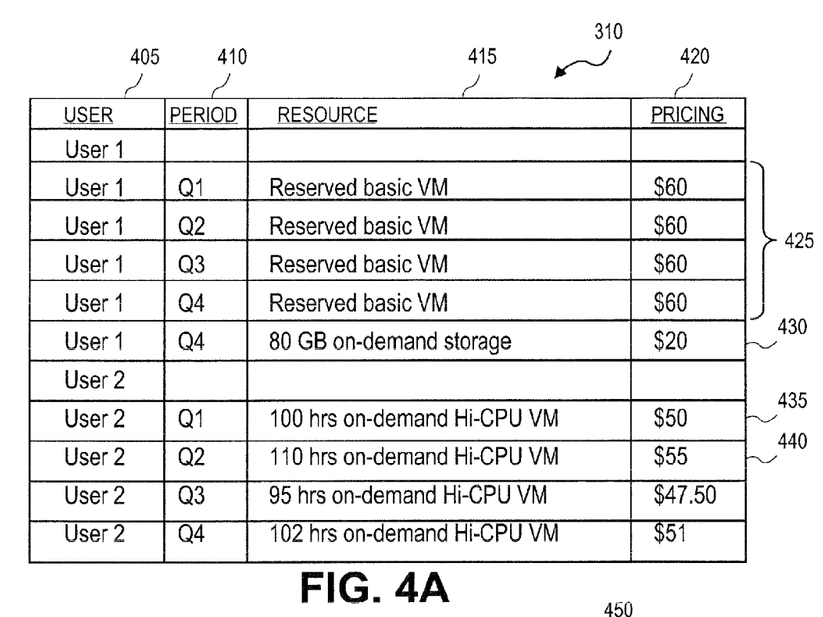
FIG. 4A illustrates exemplary usage history data for various users, various resources and various costs, according to various embodiments.

FIG. 4A illustrates exemplary usage history data for various users, various resources and various costs, according to various embodiments consistent with the present disclosure. In the example shown, a usage history 310 may contain data identifying various users (column 405) of an existing cloud 304, data identifying a time period (column 410) associated with a resource usage, data specifying a resource (column 415) or set of resources grouped into a specific configuration, and data specifying pricing or cost (column 420) associated with a resource. In the example shown, the data items in each row are associated with each other. For instance, row 430 indicates that User 1 utilized 80 gigabytes of on-demand storage during the $4^{th}$ quarter (Q4) of the year, and the cost of that on-demand storage usage was $20.00.

Additional pricing data may be extracted from analysis of a usage history 310. For example, by adding up the costs over four quarters of the year 425 ($60 per quarter), a deployment component 302 may determine that the pricing for a reserved basic virtual machine on an existing cloud 304 is $240 per year. For another example, referring to row 435 in FIG. 4A, a deployment component 302 may determine that the cost of one hour of on-demand hi-CPU virtual machine time is $0.50 per hour ($50 divided by 100 hrs.).

Figure 4B:
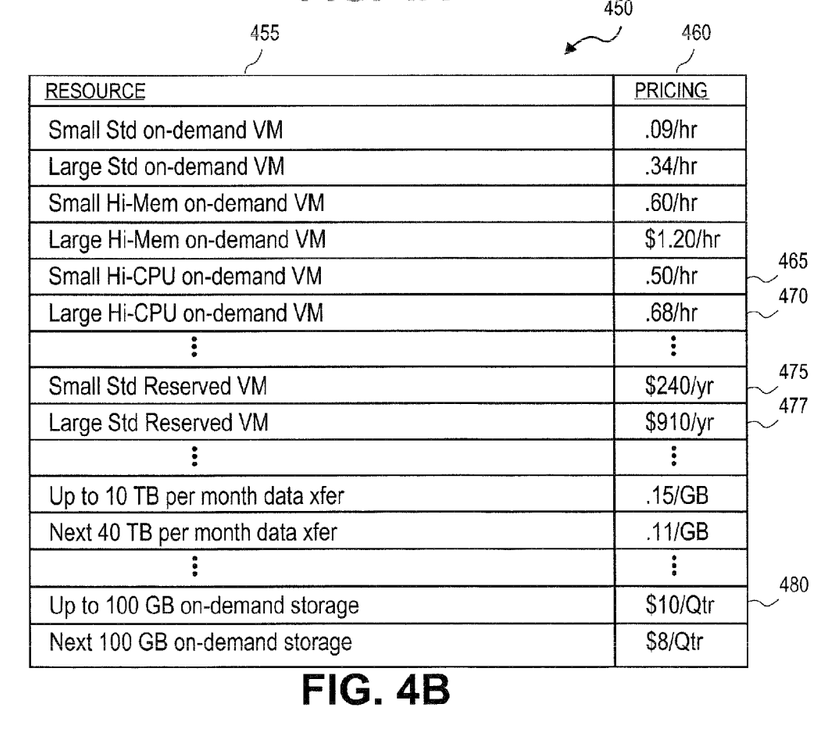
FIG. 4B illustrates exemplary pricing data for various resources available from a new cloud.

FIG. 4B illustrates exemplary pricing data for various resources available from a new cloud. In the example shown, the pricing data 450 for a new cloud 102 may include data specifying a resource or set of resources (column 455) and associated data specifying a price for usage of the resource (column 460). For instance, as shown in row 465 of pricing data 450, on-demand usage of a small instance of a hi-CPU virtual machine is priced at $0.50 per hour. For another example, row 475 of pricing data 450 indicates that reserved usage of a small standard configuration virtual machine is priced at $240 per year in the new cloud 102.

As noted above, deployment component 302 may analyze a usage history 302 (for example, as shown in FIG. 4A) with respect to resource pricing data 450 (for example, as shown in FIG. 4B) to determine whether there are resource and/or cost advantages for a user 405 to redeploy from an old cloud 304 to a new cloud 102. For example, with reference to FIGS. 4A and 4B, deployment component 302 may calculate the total aggregate annual cost for reserved usage of a basic virtual machine for user 1 as $260-$60 per quarter (425 of FIG. 4A) plus $20 to use 80 gigabytes of on-demand storage during quarter 4 (430 of FIG. 4A) when the storage capacity included with the basic virtual machine was not enough to handle User 1's data storage needs. Depending on the resources used and/or prepaid resource capacity exceeded during a specific time period (e.g., one year), other costs incurred during the time period may be aggregated to calculate the total aggregate cost. Returning to the example, deployment component 302 may analyze this $260 cost with respect to the cost of resources from the new cloud 102 that provide at least equivalent capacity to User 1. In one embodiment, deployment component 302 starts the analysis by identifying resources offered by new cloud 102 that are at least equal in capacity to the resources presently being utilized by a user. In this example, User 1 is using the reserved capacity of a basic virtual machine for one year (425). Deployment component 302 may determine from usage history 310, or from some other data source, that a basic virtual machine from existing cloud 304 is a defined set of resources consisting of 1.7 GB memory, one virtual core, 160 GB storage, and 3 MB/s I/O bandwidth. Deployment component 302 may then use this information to find an at-least-as-good virtual machine offered by new cloud 102. In this example, a small standard virtual machine (row 475) available from new cloud 102 is a defined set of resources consisting of 2.0 GB memory, one virtual core, 250 GB storage, and 3 MB/s I/O bandwidth. Large standard virtual machine (row 477) available from new cloud 102 provides additional memory capacity, four cores, double the storage capacity, and additional I/O bandwidth. Thus, deployment component 302 may determine that in the arena of resource capacity, either of small standard reserved virtual machine (row 475) or large standard virtual machine (row 477) may be used to advantageously replace the reserved basic virtual machine because both of them provide as much or more capacity for each resource that make up the virtual machines (memory, processing cores, storage, and I/O bandwidth). Moreover, either of the small standard virtual machine or the large standard virtual machine from new cloud 102 would eliminate the need to purchase 80 additional gigabytes of on-demand storage in quarter 4 (row 430), because they both include at least 250 gigabytes of storage, which is 90 gigabytes more storage than is provided by the basic virtual machine of existing cloud 304.

In some embodiments, deployment component 302 also analyzes cost and pricing in determining whether it is advantageous for a user to redeploy to a new cloud 102. Continuing the previous example, deployment component 302 may compare the pricing of small standard reserved virtual machine, $240 per year (row 475), and the pricing of large standard virtual machine, $910 per year (row 477) to the price User 1 is paying for the reserved basic virtual machine, which is $240 per year plus $20 in quarter 4 for additional on-demand storage, for a total of $260 per year. Because a large standard virtual machine costs significantly more than User 1's current deployment ($910 vs. $260), deployment component 302 may not recommend that User 1 redeploy to new cloud 102 employing the large standard virtual machine resource set. On the other hand, because the small standard virtual machine (row 475) costs $240 and eliminates the need to purchase on-demand storage (row 430), deployment component 302 may determine that it would be advantageous for User 1 to redeploy to new cloud 102 on the small standard virtual machine because the small standard virtual machine supplies resource capacity that is greater than User 1's current capacity at a lower price, when the eliminated need to purchase additional on-demand storage in quarter 4 is factored in. Moreover, if User 1 should need storage beyond 250 gigabytes, on-demand storage is less expensive in new cloud 102 (row 480) compared to existing cloud 304 (row 430).

The deployment component 302 may perform a similar analysis for User 2 (column 405). For example, deployment component 302 may determine that the small, hi-CPU, on-demand virtual machine (row 465) provides a set of resources that is equivalent and that the large, hi-CPU, on-demand virtual machine (row 470) provides a set of resources that is superior to the set of resources provided by the on-demand, hi-CPU virtual machine (e.g., row 435) of existing cloud 304. Continuing the analysis with respect to pricing, deployment engine 302 may not recommend redeployment of User 2 to new cloud 102 because there is no benefit to User 2. In this case, the large, hi-CPU, on-demand virtual machine (row 470) of new cloud 102 is significantly more expensive than User 2's current deployment: $0.68 per hour versus $0.50 per hour. And, the small, hi-CPU, on-demand virtual machine (row 465) costs the same ($0.50 per hour) without providing any extra resource capacity that User 2 needs.

Figure 5:
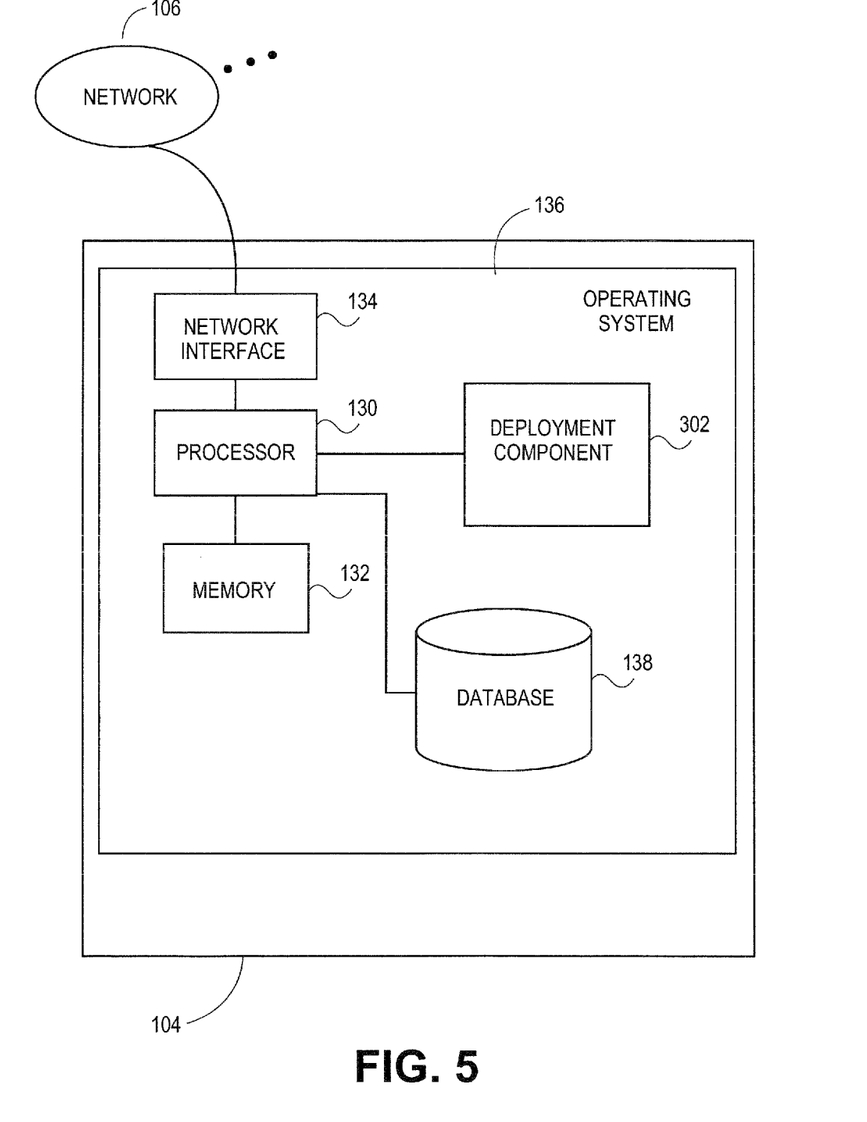
FIG. 5 illustrates an exemplary hardware configuration for a cloud-based management system, according to various embodiments.

FIG. 5 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer-readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer-readable storage medium 138 and the optimization module 302, to execute control logic, identify usage histories that would benefit from redeployment to a new cloud 102 as described herein, provide and transmit redeployment notifications and recommendations, and control the operation of virtual machines and other resources in new cloud 102. Other configurations of cloud management system 104, associated network connections, and other hardware and software resources are possible.

Figure 6:
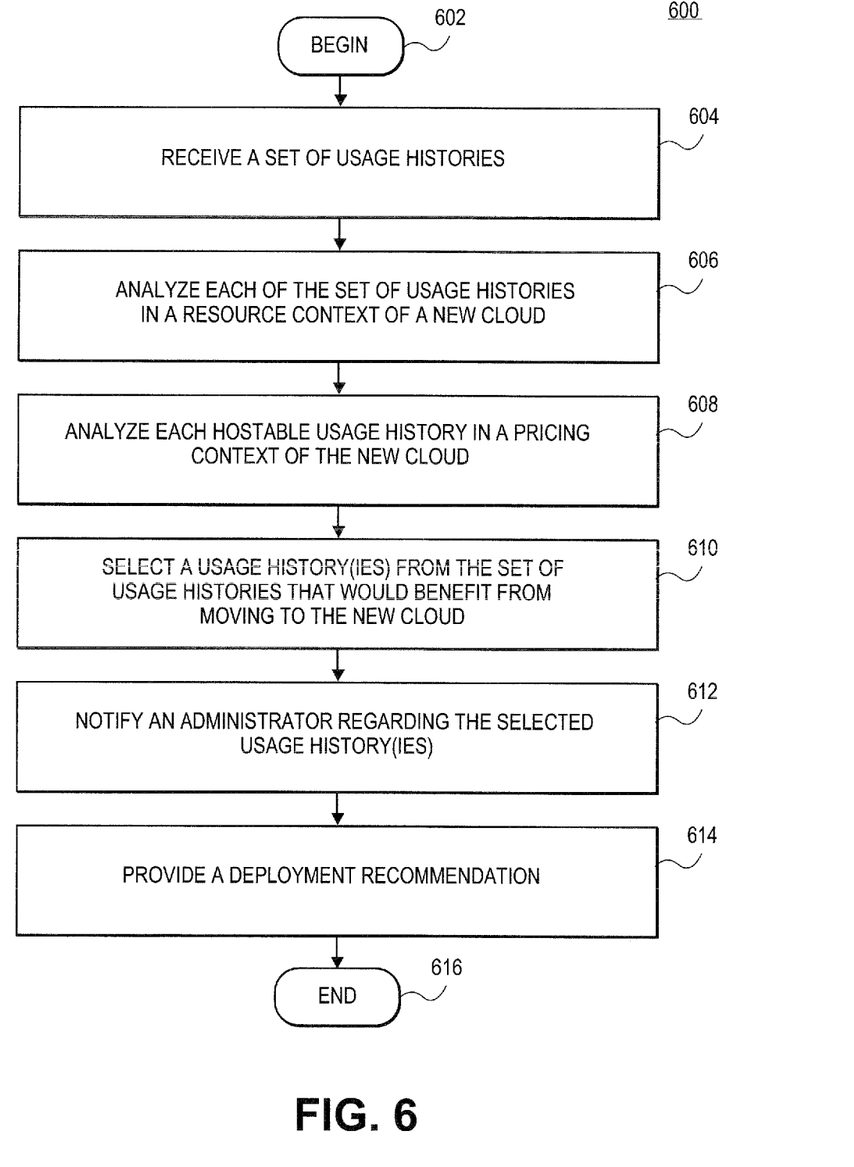
FIG. 6 illustrates an exemplary flowchart for identifying usage histories, and associated users, that may benefit from migration to a new cloud network, according to various embodiments.

FIG. 6 illustrates a flowchart of an exemplary process 600 for identifying a user who would benefit from redeployment to a new cloud, according to various embodiments. At 602, process 600 begins. In 604, a set of usage histories can be received. In embodiments, a new cloud 102 or an existing cloud 304 hosting a deployment component 302 can receive the set of usage histories. Further, in embodiments, the set of usage histories can correspond to resource usage by end users and costs to end users in a respective set of clouds other than the new cloud. In embodiments, the resource usage can be any processing or consumption metrics related to hardware, storage, software, or other resources within the other clouds.

In 606, an analysis of each the set of usage histories with respect to the resources in the new cloud is performed. The analysis may be performed using simulation, projections, modeling, comparison evaluations, or the like. In embodiments, the processing and/or consumption metrics, as reported in the usage histories, that occurred in the other existing clouds can be applied to and analyzed with respect to at least one of the resources of the new cloud to determine whether the resource(s) of the new cloud are sufficient to provide the capacity indicated by the processing and/or consumption metrics. If the new cloud can provide the resources needed by a given usage history, then the usage history may be hostable by the new cloud. In some embodiments, process 600 may also keep track of resource sets provided by the new cloud that exceed the needs of a usage history.

In 608, process 600 analyzes each hostable usage history in a pricing context of the new cloud. This analysis may be performed using simulation, projection, modeling, comparison evaluations, or the like. In embodiments, the pricing and/or cost metrics, as reported in the usage histories, that occurred in the other existing clouds can be applied to and analyzed with respect to at least one of the pricing structures of the new cloud to determine whether the pricing of the new cloud provides an advantage or benefit (e.g., a lower price) compared to the costs in the existing cloud.

In 610, a usage history(ies) that would benefit from moving to the new cloud can be selected. In embodiments, the new cloud would benefit a usage history if the new cloud could provide the same, or superior, resource capacity, as indicated in the usage history, for a lower, or no higher, a price. Further, in embodiments, there can be multiple usage histories that were selected as potentially benefiting from moving from their existing clouds to the new cloud.

In 612, an administrator of a cloud (e.g., the new cloud or an existing cloud) can be notified of the one or more usage histories that may benefit by redeploying to the new cloud.

In 614, a deployment recommendation or offer can be provided to, for example, an administrator or entity associated with the existing cloud that hosts an end user associated with a selected usage history. In embodiments, the deployment recommendation can comprise an offer to the administrator, or to the end user directly, to redeploy to the new cloud. Further, in embodiments, the offer can be directed to multiple administrators or end users associated with multiple clouds having user histories that indicate it would be advantageous to migrate to the new cloud. Still further, in embodiments, the administrators can be any user or owner associated with the clouds or anyone who has decision-making authority regarding the managing of cloud providers.

In some embodiments, the deployment recommendation may contain information informing a user or administrator specifying the advantages and/or improvements to be gained by moving the user's deployment to the new cloud.

Process 600 ends at 616. One of ordinary skill will recognize that stages may be reordered, added to, deleted from, or modified within process 600 without departing from the scope of the invention. For example, 612 may be deleted from process 600 within the scope of the invention. For another example, 614 may be replaced by an operation that automatically redeploys the user(s) that would benefit to the new cloud. In this embodiment, process 600 may redeploy a user if the benefit(s) exceeded a predetermined threshold, such as a 20% increase in resource capacity with no increase in cost, or the same resource capacity with a reduction in cost.

The foregoing description is illustrative, and variations in configuration and implementation may occur to persons skilled in the art. For example, while embodiments have been described which operate using one deployment component 302 and associated cloud management system 104, in embodiments, one or more of deployment component 302 and associated cloud management system 104, and/or other servers, data stores, and/or other logic or resources can be used. Furthermore, resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a processor, a set of usage histories, wherein a usage history among the set of usage histories comprises resource usage data and corresponding billing data associated with a user of an existing server;
determining, using the processor and in view of the resource usage data of the usage history, a pattern of resource usage associated with the user and whether a new server has sufficient resources to host the user in view of the pattern of resource usage associated with the user comprising simulating an execution of the usage history on the resources of the new server to produce simulation results and determining that the new server has sufficient resources if the simulation results indicate that a resource capacity of the new server is not exceeded, wherein the existing server and the new server are deployed in a cloud;
determining, using the processor in view of the billing data of the usage history and in view of the pattern of resource usage associated with the user, whether the new server provides a pricing benefit to the user; and
recommending, in view of the pattern of resource usage associated with the user, if the new server has sufficient resources to host the user and if the new server provides the pricing benefit, that the user deploy on the new server.

2. The method of claim 1, wherein determining whether the new server has sufficient resources comprises:
comparing the resource usage data of the usage history to a corresponding resource capacity of the new server; and
determining that the new server has sufficient resources if the corresponding resource capacity is equal to or greater than the resource usage data.

3. The method of claim 1, wherein recommending comprises:

notifying an administrator of the new server regarding recommending that the user deploy on the new server.

4. The method of claim 1, wherein recommending comprises:
notifying the user regarding recommending that the user deploy on the new server.

5. The method of claim 1, wherein recommending comprises:
redeploying the user to the new server from a server that is currently hosting the user.

6. The method of claim 1, wherein determining whether the new server provides a pricing benefit to the user comprises:
comparing the billing data of the usage history to a corresponding price available from the new server; and
determining that the new server provides the pricing benefit if the corresponding price is equal to or less than the billing data.

7. The method of claim 6, wherein comparing the billing data of the usage history to a corresponding price comprises:
comparing an aggregate of billing data over a time period to a corresponding aggregate of prices available from a new server.

8. The method of claim 1, wherein the usage history comprises resource consumption metrics and resource billing metrics.

9. A non-transitory computer-readable storage medium containing instructions that, when executed by a processor, implement operations comprising:
receiving, by the processor, a set of usage histories, wherein a usage history among the set of usage histories comprises resource usage data and corresponding billing data associated with a user of an existing server;
determining, in view of the resource usage data of the usage history, a pattern of resource usage associated with the user and whether a new server has sufficient resources to host the user in view of the pattern of resource usage associated with the user comprising simulating an execution of the usage history on the resources of the new server to produce simulation results and determining that the new server has sufficient resources if the simulation results indicate that a resource capacity of the new server is not exceeded, wherein the existing server and the new server are deployed in a cloud;
determining, in view of the billing data of the usage history and in view of the pattern of resource usage associated with the user, whether the new server provides a pricing benefit to the user; and
recommending, in view of the pattern of resource usage associated with the user, if the new server has sufficient resources to host the user and the new server provides the pricing benefit, that the user deploy on the new server.

10. A system comprising:
a memory to contain instructions; and
a processor, communicatively connected with the memory, to:

receive, by the processor, a set of usage histories, wherein a usage history among the set of usage histories comprises resource usage data and billing data for a user of an existing server;
determine, in view of the resource usage data of the usage history, a pattern of resource usage associated with the user and whether a new server has sufficient resources to host the user in view of the pattern of resource usage associated with the user comprising simulate an execution of the usage history on the resources of the new server to produce simulation results and determine that the new server has sufficient resources if the simulation results indicate that a resource capacity of the new server is not exceeded, wherein the existing server and the new server are deployed in a cloud;
determine, in view of the billing data of the usage history and in view of the pattern of resource usage associated with the user, whether the new server provides a pricing benefit to the user; and
recommend, in view of the pattern of resource usage associated with the user, if the new server has sufficient resources to host the user and the new server provides the pricing benefit, that the user deploy on the new server.

11. The system of claim 10, wherein recommending comprises:
notify an administrator of the new server regarding recommending that the user deploy on the new server.

12. The system of claim 10, wherein recommending comprises:
notify the user regarding recommending that the user deploy on the new server.

13. The system of claim 10, wherein recommending comprises:
redeploy the user to the new server from a server that is currently hosting the user.

14. The system of claim 10, wherein determine whether the new server provides a cost benefit to the user comprises:
compare the billing data of the usage history to a corresponding price available from the new server; and
determine that the new server provides the pricing benefit if the corresponding price is equal to or less than the billing data.

15. The system of claim 14, wherein compare the billing data of the usage history to a corresponding price comprises:
compare an aggregate of billing data over a time period to a corresponding aggregate of prices available from a new server.

16. The system of claim 10, wherein the usage history comprises resource consumption metrics and resource billing metrics.

17. The system of claim 10, further comprising:
a network interface, connected to the processor, to communicate with existing servers to receive the set of usage histories.

* * * * *